S. KANN.
CRAYON SHARPENER.
APPLICATION FILED FEB. 19, 1908.

901,622.

Patented Oct. 20, 1908.

Witnesses:
Gertrude K. Brennan
Willard Schwartz

Inventor:
Samuel Kann
by Lester H. Dittenhoefer
Attorney.

UNITED STATES PATENT OFFICE.

SAMUEL KANN, OF NEW YORK, N. Y.

CRAYON-SHARPENER.

No. 901,622.     Specification of Letters Patent.     Patented Oct. 20, 1908.

Application filed February 19, 1908. Serial No. 416,692.

*To all whom it may concern:*

Be it known that I, SAMUEL KANN, a citizen of the United States, and a resident of New York, in the county and State of New York, have invented certain new and useful Improvements in Crayon - Sharpeners, of which the following is a specification.

My invention relates to sharpeners adapted to sharpen crayons such as are ordinarily used by tailors, draftsmen, artists, etc.

Figure 1:
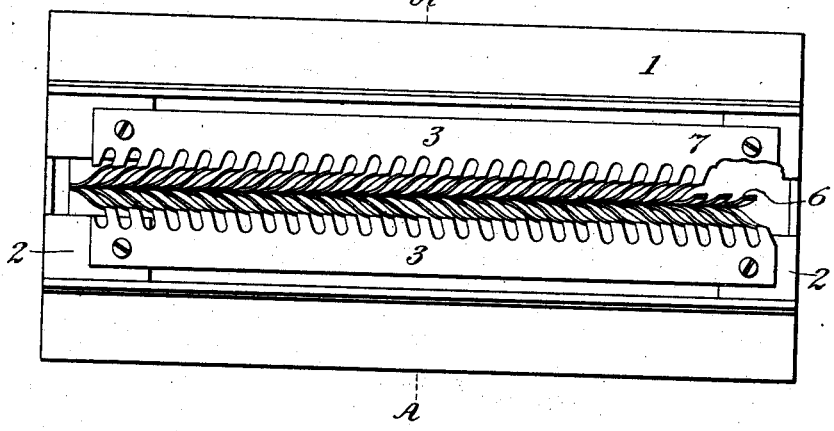
Figure 2:
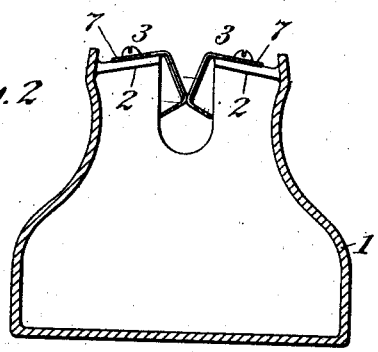
Figure 3:

The objects of my invention are, first, to provide a device whereby crayons may be sharpened more rapidly and safely than is possible with the use of present devices; secondly, to provide means for sharpening crayon so that its edge will be even and have a uniform thickness along its length; thirdly, to provide means for retaining the loosened particles of crayon dust or shavings so as to prevent their being scattered about. I attain these objects by the device illustrated in the accompanying drawings, in which Figure 1 is a plan view of the device from the top; Fig. 2 is a section in elevation through the line A A in Fig. 1; and Fig. 3 is a detailed view in elevation of the abrading strip.

Similar letters refer to similar parts throughout the several views.

The frame (1) of the sharpener is made in the form of a hollow box open at the top and partially open at the ends. The sides slope upward from the base to the top and extend in the shoulders or projections (2) forming supports upon which are mounted the two opposing abrading strips (3).

The framework of the sharpener is preferably made of castiron or other suitable material, so that it may be used as a weight to hold the papers or cloth upon which the sharpened crayon is to be used.

I prefer to make the framework of my sharpener in the form shown in the accompanying drawings, as this form is particularly adapted and suitable to be held by the hand of the operator while the crayon is being sharpened. I do not, however, limit myself to any particular shape or form of a frame, nor to any particular material of which it may be made.

The abrading strips (3) are preferably made of comparatively thin strips of sheet metal or other suitable material. In the body of the strip are stamped or otherwise fashioned a series of cutting blades (4) leaving a slight space (5) separating the adjacent blades.

The blades are formed with a flat surface and have the edges thereof compoundedly curved, as is shown in Figs. 2 and 3. The cutting edge (6) is slightly raised and sharpened. The axes of the blades deviate slightly from the normal so that when the abrading strips are fastened to the frame the blades run in an oblique direction.

The strips are bent in such a manner that when the bent over portions (7) are supported on and fastened to the shoulder (2), the oppositely disposed strips will project inwardly and converge towards each other forming a V or wedge shaped aperture.

The manner in which my device works is as follows: The chalk or crayon is inserted between the two opposite and converging rows of cutting blades and is drawn between them whereby particles of the crayon are shaved off and the edge of the crayon caused to assume the shape of the aperture, thereby sharpening and giving it a fine and even marking edge. The small particles of crayon loosened by this operation drop through the spaces between the adjacent blades and are caught and detained in the box shaped frame of the device.

By reason of the compoundedly curved edges of the blades of my sharpener it will operate more smoothly and with less likelihood of the crayon being broken off in the sharpening operation than with one having straight edged blades.

What I claim as my invention and desire to secure by Letters Patent is:

1. A sharpener of the character specified comprising a hollow frame carrying two opposed and converging abrading strips, each of said strips having a series of obliquely extending parallel blades formed therein and integral therewith, said blades having compoundedly curved edges, which edges form a common plane parallel to the plane of the strip, and said blades being bent at an angle to the plane of the strip so as to present an abrading surface, substantially as described.

2. A sharpener of the character specified, comprising a hollow frame having shoulders to which are suitably fastened two continuous abrading strips, each of said strips having a series of obliquely extending parallel blades formed therein and integral therewith, said blades having compoundedly curved edges, which edges form a common plane parallel to the plane of the strip, and said blades being bent at an angle to the plane of the strip so as to present an abrading surface, the opposite strips converging towards each other so as to form a V shaped aperture, substantially as described.

3. An abrading strip having a series of obliquely extending parallel blades formed therein and integral therewith, said blades having compoundedly curved edges, which edges form a common plane parallel to the plane of the strip, and said blades being bent at an angle to the plane of the strip so as to present an abrading surface, substantially as described.

SAMUEL KANN.

Witnesses:
LESTER F. DITTENHOEFER,
GERTRUDE K. BRENNAN.